United States Patent

[11] 3,579,054

[72] Inventor David S. Moulton
 145 E. Center St. Apt. 32, Provo, Utah 84601
[21] Appl. No. 835,195
[22] Filed June 20, 1969
[45] Patented May 18, 1971

[54] GRAVIMETER UTILIZING MASS OF IONS
 10 Claims, 3 Drawing Figs.
[52] U.S. Cl. ............................................... 317/231, 73/282
[51] Int. Cl. ............................................... H01g 9/00, G01m 3/40
[50] Field of Search............................................... 317/230, 231, 232, 233; 324/33; 73/382; 310/2

[56] References Cited
UNITED STATES PATENTS

| | | | |
|---|---|---|---|
| 2,615,940 | 10/1952 | Williams........................ | 317/231X |
| 2,714,189 | 7/1955 | Ballard, Jr. .................... | 317/230X |
| 2,735,949 | 2/1956 | Podalsky ....................... | 317/231X |
| 2,837,082 | 6/1958 | Elliott et al. ................... | 317/231X |
| 3,095,744 | 7/1963 | Hutchins et al............... | 73/382 |
| 3,465,593 | 9/1969 | Stevens ......................... | 73/382 |
| 3,485,103 | 12/1969 | Custard......................... | 73/382 |

Primary Examiner—James D. Kallam
Attorney—Samuel Levine

ABSTRACT: A gravimeter comprising a voltage generator cell and a voltmeter-type instrument responsive to variations of the generated voltages. The cell comprises a tubelike container in which a metal and a solution of its chloride salt cooperate to form the metal ions. The ions form different concentrations at the top and bottom of the tube, and are held in such distribution pattern against the gravitational field force by the electrostatic charge opposing such force. Altitudinal movement of the cell relative to the earth's center changes the gravitational field force with a resulting movement of ions and electrons whereby a variation in the voltage generated by the cell takes place. The change in voltage is generated by the voltage responsive instrument, which may be calibrated to indicate the gravitational field force.

To increase and strengthen the degree of voltage change, a number of cells may be connected serially whereby the voltage variation registered by the voltmeter is the sum of the voltages generated by all the interconnected cells.

Patented May 18, 1971 3,579,054
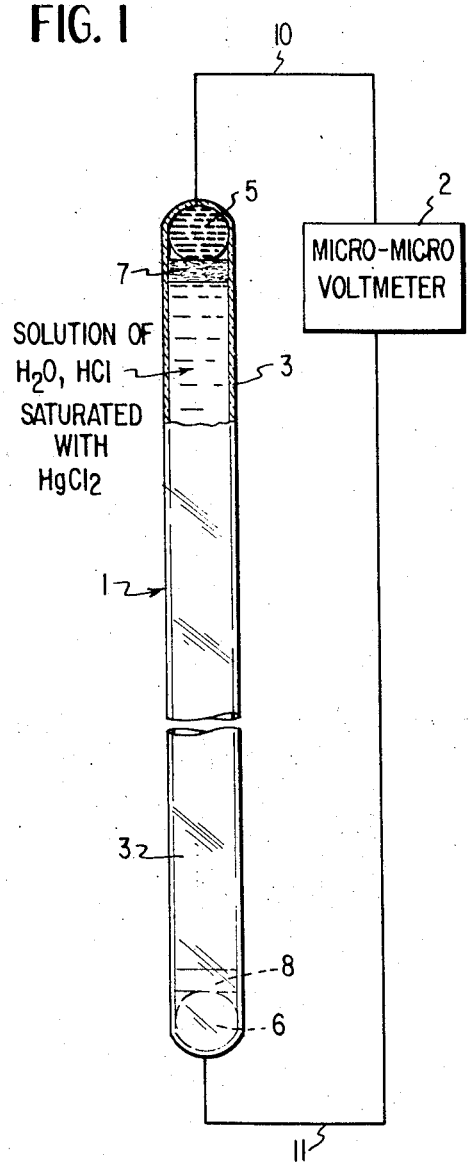
FIG. 1
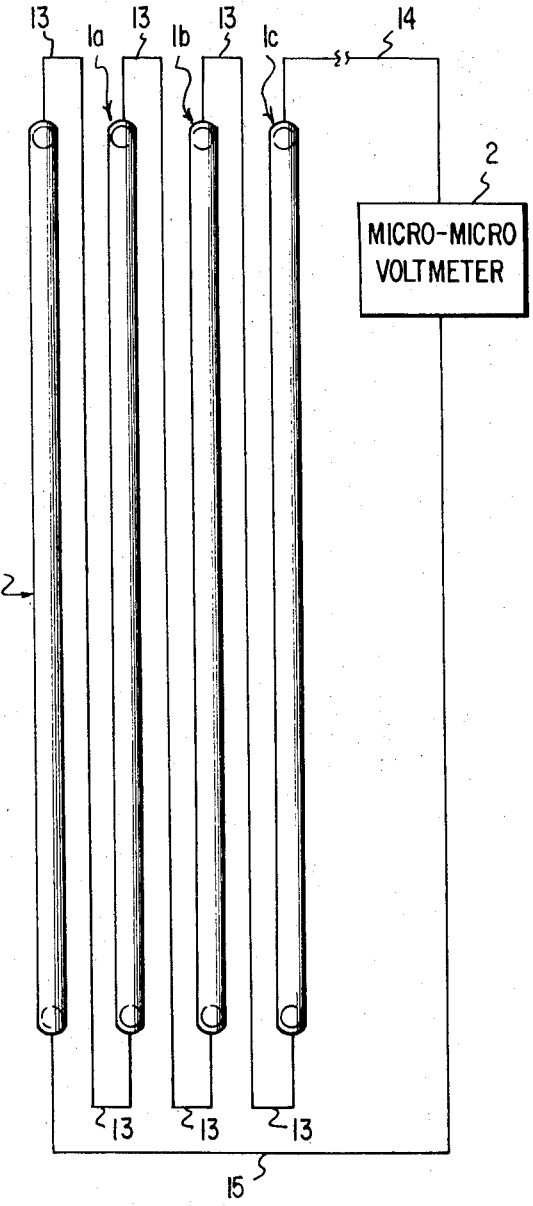
FIG. 2
FIG. 3
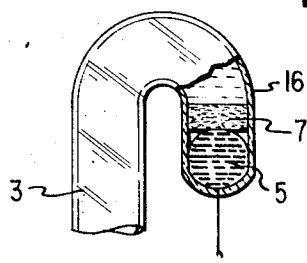
INVENTOR
DAVID S. MOULTON
BY *Samuel Levine*
ATTORNEY

GRAVIMETER UTILIZING MASS OF IONS

This invention relates to gravimeters.

The gravimeters of the prior art usually comprise a mass in the form of either a freely falling weight, a pendulum, or a biased movable mass, and a means to measure the distance moved and the velocity or acceleration of the moving mass at a particular altitude. Upon obtaining these factors, the gravitational field force at that altitude may be calculated from the conventional gravitational field equation.

Such gravimeters are heavy, cumbersome and require delicate instruments to measure the various factors involved in the gravitational field equation. They require firm supports and a great deal of time to set up and adjust the various instruments and calculate the final results.

An object of this invention is to provide a light, portable gravimeter which needs not weighty mass and the necessary instruments to measure the various factors of the movement of the mass necessary to calculate the gravitational field force.

A further object is to provide an electric-type gravimeter which utilizes the mass of ions, the movement of which under the gravitational field force generates an electric current, whose voltage may be measured to indicate the magnitude of the gravitational field force.

A further object is to provide a gravimeter comprising a chemical cell wherein ions are formed and move under the influence of varying gravitational field forces; the ion movement generating varying voltages which are detected by a voltage responsive means. To strengthen and increase the magnitude of the voltage variations, a number of cells may be connected in series.

Further objects and advantages will be apparent from the following description and accompanying drawing, wherein:

FIG. 1 is a partly sectioned and partly diagrammatic view of the gravity meter;

FIG. 2 illustrates the manner in which a multiplicity of gravimeter chemical cells may be serially connected to increase the magnitude of the generated voltage; and FIG. 3 shows a modification in the end structure of the cell's tube.

Referring to FIG. 1, the gravimeter comprises a chemically, electric generating cell unit 1, which is in the form of an elongated tubular container, and a voltmeter 2, which detects the voltages of the generated current. Cell 1 consists of a tube 3 made of any suitable material, such as glass, or plastic, or other type of material which does not react with the chemical components contained in the tube. For exemplary purposes only, and to illustrate a preferred embodiment of the invention, the use of certain specific chemical components will be disclosed. However, as will be pointed out later, other chemical components for obtaining the same, or somewhat similar results, may be utilized.

The tube is filled with weak hydrochloric acid saturated with mercuric chloride. Character 5 designates a small mass or globule of liquid metallic mercury at the top of tube 3 and 6 designates a similar mass of liquid mercury at the bottom. Mercury masses 5 and 6 are held in place by mats or screens 7 and 8, respectively. The mats may be made of fiber, such as asbestos, or of fine metallic wire wetted by mercury. The metal may be platinum or a similar relatively inert metal. Conductors 10 and 11 lead from mercury masses 5 and 6 to voltmeter 2. Since the generated voltages are extremely small, a very sensitive voltmeter capable of sensing very low voltage variations must be used. As illustrated in FIG. 1, the voltmeter is designated as a "micro-micro" voltmeter. As will be pointed out herebelow, other voltage responsive means may be used in lieu of a voltmeter.

In operation, the cell generates a voltage which is proportional to the gravitational field force. Any variation in the gravitational field force, such as that caused by a change in the altitudinal position of cell 1 varies the generated voltage, which variation is sensed by and indicated on voltmeter 2.

The cell generates a voltage in view of the following interactions of the chemical components. Mercuric chloride is a salt, and all salts in the solid state can be characterized as being composed of an ordered arrangement of ions, rather than as a mass of molecules. Thus, when mercuric chloride is dissolved, the ions dissociate from one another and exist in solution as $Hg^{++}$ and $2Cl^1$ ions. It is well known that a solution containing $Hg^{++}$ ions is in contact with liquid mercury some of the mercury ions in the solution enter the liquid mercury, and at the same time, some of the liquid mercury enters the solution. The rest is a formation of ions and electrons which are distributed at the top and bottom of the tube and are held in such positions, especially those at the top of the tube, by an electrostatic field sufficient to oppose the gravitational force field. The electrostatic field is produced by the slight difference in concentration between the top and bottom.

The charge E in volts which is necessary to hold the ions at the top against gravity may be calculated from the following equation:

$$E = \frac{mgh}{q} \quad \text{(equation) 1)}$$

wherein $m$, the mass of mercury ion, is about 210 atomic mass units $\times$ 1.67$\times 10^1$kg./atomic mass units; $q$ is the number of charge units, which is 2 (because Hg is doubled ionized to $Hg^{++}$, measured in coulombs); and $h$ is the length of tube 1 which may be chosen as 1 meter.

Substituting these values in the above equation:

$$E = \frac{(201)\ (1.67 \times 10^{-27})\ kg.\ (9.8)\ \text{meters/sec.}^2}{(2)\ (1.60) \times 10^{-19})\ \text{coulombs}} =$$

$$10.3 \times 10^{-6}\ \text{volts}$$

The weight of the mercury ion needs adjustment in view of the buoyant force of the liquid solution. However, the force would be only about 3 percent and E would be approximately $10 \times 10^1$volts.

Now, it is necessary to find out what change in E takes place to detect the difference in the gravitational field force due to moving away from the center of the earth a given distance, say, 1 meter.

Gravitational acceleration above the surface of the earth can be expressed as a function of the distance from the center of the earth by the following equation:

$$g = \frac{GM}{r^2} \quad \text{(equation 2)}$$

wherein $r$ is the distance from the earth's center; M is the mass of the earth; and G is a constant.

Substituting the value of $g$ of equation (1) in equation (2)

$$E = \frac{mh(g)}{q} = \frac{mhGM}{qr^2}$$

and differentiating with respect to $r$ and assuming small finite differences, $dr$ yields $$\frac{dE}{dr} = \frac{-2GMmh}{qr^3}$$

Now substituting the appropriate values and constants:

$$\frac{dE}{dr} =$$

$$\frac{-2 \left( 6.67 \times 10^{-11}\ \frac{\text{Newton's/meters}^2}{kg^2} \right) (5.98 \times 10^{24}\ kg.)}{(6.37 \times 10^6\ \text{meters})^3} \times \left( \frac{mh}{q} \right)$$

The value of $mh/q$ is $1.05 \times 10^{-6}$ volts kg./Newton and therefore upon multiplication $$\frac{dE}{dr} = -3.2 \times 10^{-12}\ \text{volt/ meter}$$

The above means that is voltmeter 2 is of sufficient sensitivity to detect a decrease of $3.2 \times 10^{112}$ volts, the gravimeter comprising a single cell unit 1 would detect the difference in the gravitational field strength due to an increase of one meter in altitude. There are some voltage responsive and detecting devices in the form of "electron counters," which can detect and register such small voltage changes.

In order to increase the sensitivity and obtain a greater magnitude of voltage change due to changes in altitude, a number of cell units may be connected in series. This arrangement is illustrated in FIG. 2 wherein cells 1, 1a, 1b, 1c, etc., are connected in series by conductors 13, and the connected cells are finally connected to the voltmeter by conductors 14 and 15. Thus if 10 cells were serially connected, a one-meter change in altitude would generate $3.2 \times 10^{111}$ volts, and if 100 cells were serially connected they would generate $3.2 \times 10^{110}$ volts. A voltmeter or any other instrument sufficiently sensitive to respond to the variations in voltage generated by a cell, or a number of serially connected cells, may be utilized, and the indication means of the instrument may be calibrated to give a direct reading of the value of the gravitational field force at the altitudinal position of the gravimeter.

FIG. 3 illustrates a modification of an end of a cell tube to retain the mercury mass. The tube end is bent over to form a short depending leg 16 and the liquid mercury mass is at the bottom of the leg. Means similar to mats 7 and 8 of FIG. 1 may be used or may be omitted.

While the preferred embodiment herein described disclosed the use of mercuric chloride and liquid mercury, other chemical components may be used which dissociate to form the ions. For example, any chlorine containing slat, with or without other additives which have the effect of increasing the current or amperage to thereby make the voltage measurement easier may be used. A small amount of sodium hypochlorite may be used. Similarly, other metals may be used instead of mercury. For example, copper and cupric chloride and zinc and zinc chloride may be used. Of course, some metals, such as platinum and nickel, may be too inert and other, such as magnesium or calcium may be too active. In general, chemical components which form ions and interact in the same manner as the mercury and mercuric chloride in the cell described above may be used for generating the voltage by variation in the gravitational field force. Liquid mercury has the advantage of being already in the liquid state and does not require the additional energy necessary to change a solid metal, such as copper, to the liquid or solution stage.

Although a certain preferred embodiment of the invention has been disclosed for purpose of illustration it will be evident that various changes and modifications may be made therein without departing from the scope and spirit of the invention.

I claim:

1. A gravimeter comprising a cell of an elongated vertical container filled with chemical components comprising a metal in the form of a plurality of metal masses and a salt of said metal in solution, thereby causing the dissociation of ions and movement thereof under influence of variation in the gravitational field forces as the altitudinal position of said cell changes, said ion movement generating electric currents, and voltage responsive means electrically connected to said metal masses for measuring the voltages of said generated currents.

2. A gravimeter according to claim 1 wherein the salt is the chloride of said metal.

3. The gravimeter according to claim 2 wherein the container is a vertical tube with one metal mass at its top, a second metal mass at its bottom and the solution therebetween, and the voltage responsive means is connected to said top and bottom metal masses.

4. The gravimeter according to claim 3 wherein a metal mass is retained in its respective place by means having interstices to permit the solution to contact the metal mass.

5. The gravimeter according to claim 3 wherein the metal is liquid mercury and the salt is mercuric chloride.

6. The gravimeter according to claim 5 wherein the mercuric chloride saturates a weak hydrochloric acid.

7. The gravimeter according to claim 6 wherein the voltage responsive means is a voltmeter.

8. The gravimeter according to claim 7 wherein additional cells are serially connected between said cell and the voltmeter to thereby increase the voltage sensed by the voltmeter.

9. The gravimeter according to claim 3 wherein at least one end of the tube is bent over to form a short dependent leg, generally parallel to the axis of the tube, said leg containing the metal mass.

10. The gravimeter according to claim 4 wherein the metal is liquid mercury and the means having interstices is a mat of loose wires wetted with the liquid mercury.